July 17, 1962
B. P. FRANKLIN ET AL
3,044,794
COLLAPSIBLE UTILITY CART
Filed Oct. 3, 1961
2 Sheets-Sheet 1
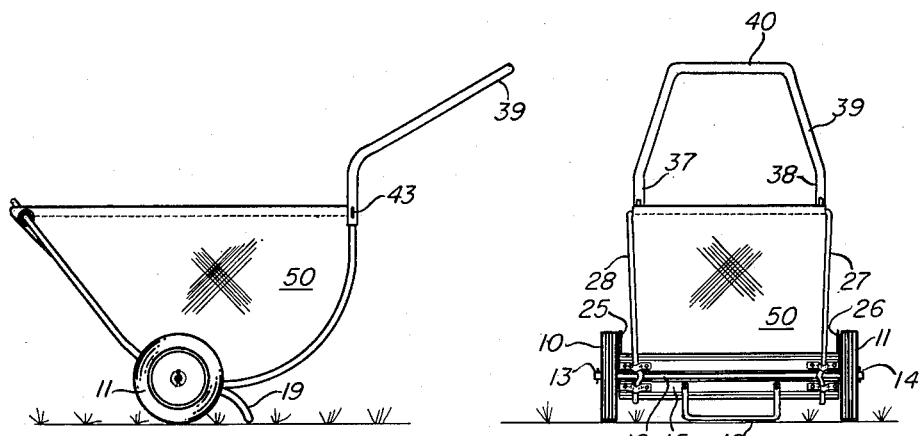
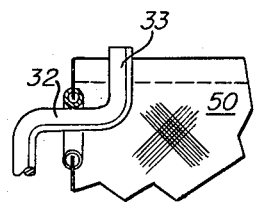
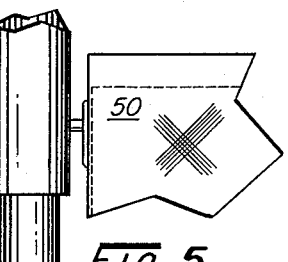
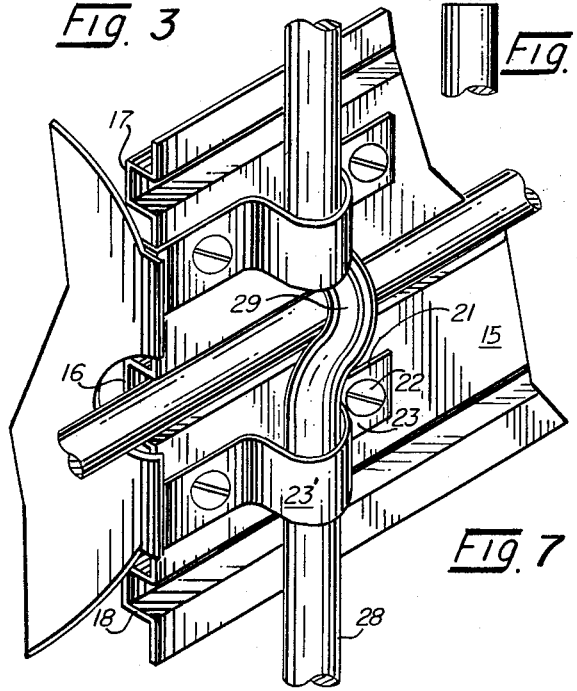
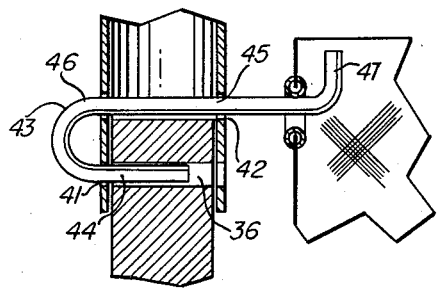
INVENTORS
Burton P. Franklin
BY Clemouth E. Pollard
*B. B. Olive*
ATTORNEY July 17, 1962  B. P. FRANKLIN ET AL  3,044,794
COLLAPSIBLE UTILITY CART Filed Oct. 3, 1961  2 Sheets-Sheet 2

INVENTORS
Burton P. Franklin
BY Clemouth E. Pollard
B. B. Olive
ATTORNEY

United States Patent Office 3,044,794
Patented July 17, 1962

3,044,794
COLLAPSIBLE UTILITY CART
Burton P. Franklin, Bachelor Hall, and Clemouth E. Pollard, Danville, Va., assignors to H. K. Porter Company, Danville, Va., a corporation of Delaware
Filed Oct. 3, 1961, Ser. No. 142,601
5 Claims. (Cl. 280—36)

This invention relates to a collapsible utility cart and more particularly to a two-wheeled cart having a foldable frame and a flexible service bag adapting the cart to be folded to a relatively convenient size for storage and the like.

An important object of this invention is to produce a collapsible utility cart which, when collapsed, occupies a relatively small space.

Another object of this invention is to produce a collapsible utility cart capable of transporting relatively heavy and bulky household materials such as garden waste, laundry and the like.

A further object of this invention is to provide a collapsible utility cart with a flexible bag that may be easily removed and cleaned.

Another object of this invention is to provide a collapsible utility cart with a removable handle that rigidly secure the cart's supporting rods in an upright position.

Another object of this invention is to provide a collapsible utility cart having a removable handle connected to rods supporting a service bag and in which a novel handle locking clip serves both as a means of locking the handle to the supporting rods and as a means of suspending one corner of the flexible bag.

Other objects and advantages of this invention will become apparent during the course of the following description.

In reference to the drawings:

FIGURE 1 is a side elevation view of a cart embodying the principles of the invention.

FIGURE 2 is an elevation view of the front of the cart.

FIGURE 3 is a fragmentary view partly in section showing the rod support arrangement for the front corners of the flexible bag.

FIGURE 4 is a fragmentary view showing the pin means for connecting the handle and supporting the rear corners of the flexible bag.

FIGURE 5 is a fragmentary view similar to FIGURE 4 but with the handle connected and the bag corner in support position.

FIGURE 6 is a fragmentary view partly in section of FIGURE 5.

FIGURE 7 is a fragmentary bottom perspective view of one side o fthe cart undercarriage showing the spatial relationship of the axle, supporting rod, wheel guard, wheel guard brackets and base plate.

Figure 10:
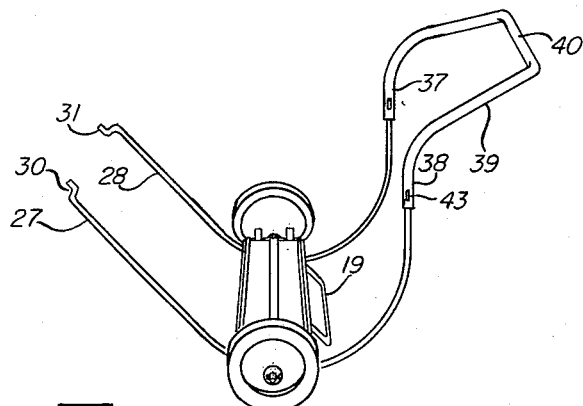
FIGURE 10 is a perspective view of the cart frame with the handle installed but without the flexible bag.
Figure 12:
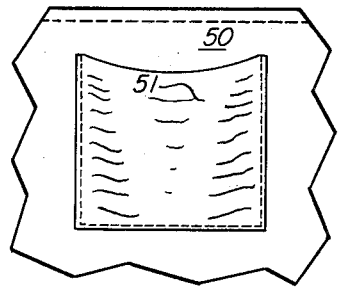
FIGURE 12 is a fragmentary elevation view showing the bag pocket.
Figure 11:
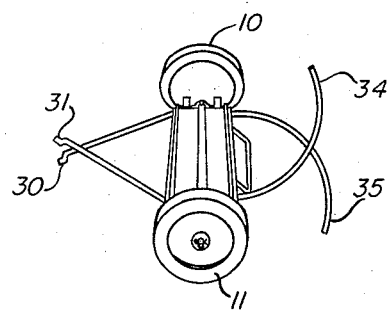
FIGURE 11 is a perspective view of the cart frame showing the supporting rods collapsed for storing.
Figure 8:
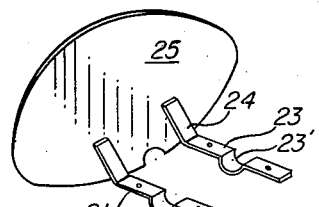
FIGURE 8 is a perspective view of the wheel guard.
Figure 13:
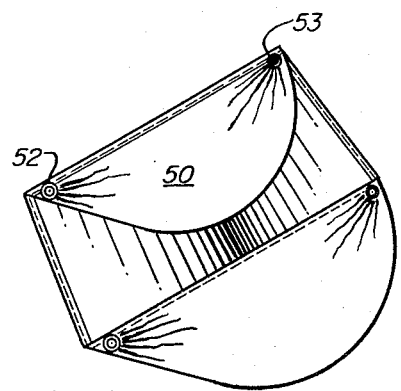
FIGURE 13 is a perspective view showing the general contour of the service bag when extended.
Figure 9:
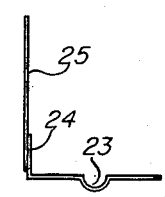
FIGURE 9 is an end elevation view of the wheel guard.

As disclosed in the drawings, the cart includes two ground engaging wheels 10 and 11 rotatably mounted on the projecting ends of an axle 12 and retained thereon by cotter pins 13 and 14.

Resting on axle 12 between wheels 10 and 11 is a rigid elongated base plate 15. Base plate 15 is provided with one central ridge 16 in which the axle 12 partially resides and a plurality of strength increasing ridges 17 and 18 all of which are parallel to axle 12. Rigidly attached to the underside of base plate 15 and in the middle thereof by nut and bolt arrangements is a ground engaging rest stand 19 preferably being of the design illustrated by FIGURE 2. The cart becomes rollably operable when the rest stand 19 is disengaged from the ground.

To the underside of base plate 15 and at each end facing wheels 10 and 11, a pair of laterally spaced horizontally positioned L-shaped brackets 21 are attached, each including a long flange 23 and a short flange 24. Two nut and bolt arrangements 22 rigidly connect each long flange 23 of the L-shaped brackets 21 to the base plate 15. Each long flange 23 includes a bent U-shaped portion 23' equi-distantly placed between the respective two nut and bolt arrangements. Each short flange 24 is vertically upwardly positioned and integrally connected with one of a pair of wheel guards 25 and 26. Wheel guards 25 and 26, being vertically positioned above base plate 15, prevent the wheels 10 and 11 from rubbing against the base plate 15 and against the flexible service bag referred to later.

The U-shaped portions 23' of brackets 21 are adapted to pivotably receive a pair of supporting rods 27 and 28 whose purpose will become apparent as the description proceeds. Supporting rods 27 and 28 are approximately U-shaped in design and include a small angularly displaced U-shaped portion 29 at the vertex thereof which is adapted to receive the axle 12. This U-shaped portion 29 prevents the respective supporting rod 27 or 28 from sliding through its respective brackets 21 and the angular displacement from the general plane of the rod allows the U-shaped portion 29 to impinge against axle 12 which limits the supporting rods' outward pivotal swing to a substantially vertical position. The front ends 30 and 31 of supporting rods 27 and 28, respectively, are somewhat Z-shaped squares with member 32 of the supporting rods being bent perpendicularly inward to the general plane in which the rods reside, and with member 33 of the supporting rods being bent perpendicularly upward. The ends 34 and 35, opposite ends 30, 31, of supporting rods 27 and 28, respectively, are provided with a circular hole 36 which is drilled perpendicular to the rods' general geometrical plane and whose purpose is later explained.

Ends 34 and 35 of supporting rods 27 and 28 are slidably mountable in the ends 37 and 38 of a tubular handle 39. Handle 39 is shaped somewhat in the form of a flared U with a connecting portion 40 of the U being substantially straight. Ends 37 and 38 of the handle 39 are curved downwardly to receive the ends 34 and 35 of the supporting rods 27, 28. As will be apparent from the drawings, handle 39 serves as a means to rigidly position supporting rods 27 and 28 when engaged therewith. When the handle is removed from the ends 34 and 35 of the supporting rods 27 and 28, the supporting rods may be folded inwardly which thereby gives the cart its collapsible nature.

In the ends 37 and 38 of the handle 39, circular holes 41 and 42 are drilled perpendicular to the handle at that point and parallel with the straight connecting portion 40. In the circular holes 41 and 42, a handle locking clip 43 is slidably mounted and is permanently resided therein. Handle locking clip 43 is a single planier, homogeneous circular rod comprising essentially four members or sections. Member 44 is a linearly straight section of clip 43 that is slidably located in the circular hole 36 of the respective supporting rod 27 or 28 and which serves to lock handle 39 to the respective supporting rod ends 34, 35. Member 45 is a straight portion of clip 43 parallel with member 44 and slidably positioned in holes 41 and 42 of handle 39 so as to act as a positioning means whereby the supporting rods are easily positioned in the ends of the handle. That is, when the respective supporting rod end butts up against the respective member 45, clip 43 is ready to be locked in position. Member 46, a curved closed end, connects member 44 to member 45. A portion of member 45 projects through handle 39 and a member 47 of clip 43 is bent perpendicularly upward from member 45 at the end thereof.

A flexible service bag 50, formed of any suitable flexible or pliable material such as canvas, is suspended from the respective locking clips 43 and from the respective ends 30 and 31 of supporting rods 27 and 28. The flexible bag's shape is generally contourly equal to the boundary defined by the supporting rods 27 and 28. Flexible bag 50 is provided with a pocket 51 which is integrally attached to the outside thereof and adapted to receive and retain objects placed therein. Flexible bag 50 is also provided with large eyelets 52 for the purpose of making connections between the rod ends and each of the front two corners of flexible bag 50 and with small eyelets 53 for the purpose of making connections between the clips 43 and the respective rear two corners of flexible bag 50. By inserting the respective member 33 of each of the supporting rods 27 and 28 through the respective large eyelet 52 and by letting large eyelet 52 reside on and around the respective member 32 of the supporting rods 27 and 28, the front two corners of flexible bag 50 will thus be removably suspended from the ends 30, 31 of the supporting rods 27 and 28. Likewise, the rear two corners of flexible bag 50 may be removably suspended from member 45 of each handle locking clip 43.

The cart may be collapsed for storage very easily. To collapse the cart from an erected position, the respective member 44 of each handle locking clip 43 is retracted from the respective circular hole 36 in supporting rods 27 and 28. By removing member 44 from each respective hole 36, handle 39 becomes unlocked from supporting rods 27 and 28 and is free to be removed therefrom, which leaves supporting rods 27 and 28 free to pivot inwardly. After folding supporting rods 27 and 28 to a position approximately parallel with axle 12, the cart is of a size convenient for storage.

Having explained the invention, what is claimed is:

1. A collapsible household utility cart comprising an axle adapted to receive at each projecting end a ground engaging wheel; an elongated base plate resting on said axle and extending lengthwise between said wheels; a vertically positioned plate wheel guard located at each end of said base plate adjacent said wheel, said wheel guard being connected to said base plate through a pair of laterally spaced brackets including bent portions attached to and beneath said plate and extending on either side of said axle; a U-shaped rod normally substantially vertically positioned at each end of and in a plane substantially perpendicular to said axle, said rod having one end in front of and one end behind said axle and having a vertex portion extending beneath said axle and pivotally supported in said bracket bent portions; a curved tubular handle having open ends adapted to receive the respective rear ends of said rods; clip means slidably mounted in each end of said handle and positionable to lock said handle to said respective rear ends, said clip means each including an integral hook extending therefrom; a flexible service bag including a substantially rectangular opening having supporting eyelets at the respective front and rear corners thereof, said front eyelets being adapted for connection to the front ends of said rods and said rear eyelets being adapted for connection to said hooks thereby enabling said bag to be freely supported by said rods; said cart being collapsible through disengagement of said clip means, removal of said handle and inwardly folding of said rods.

2. A collapsible household utility cart as claimed in claim 1 in which said rod vertex portion is bent inwardly with respect to the principal plane occupied by said rod whereby to furnish a positive stop to the outward swing of said rod.

3. A collapsible household utility cart as claimed in claim 1 and including a foot stand connected to said plate enabling said cart to be parked in upright position.

4. A collapsible household utility cart as claimed in claim 1 in which said clip means further includes an integral pin member so located and positioned within said handle as to furnish a positive abutment for locating said rod rear end with respect to said handle end.

5. A collapsible household utility cart comprising an axle adapted to receive at each projecting end a ground engaging wheel; an elongated base plate resting on said axle and extending lengthwise between said wheels; a vertically positioned plate wheel guard located at each end of said base plate adjacent said wheel, said wheel guard being connected to said base plate through a pair of laterally spaced brackets including bent portions attached to and beneath said plate and extending on either side of said axle; a U-shaped rod normally substantially vertically positioned at each end of and in a plane substantially perpendicular to said axle, said rod having one end in front of and one end behind said axle and having a vertex portion extending beneath said axle and pivotally supported in said bracket bent portions, said vertex portion being bent inwardly with respect to the principal plane occupied by said rod whereby to furnish a positive stop to the outward swing of said rod; a curved tubular handle having open ends adapted to receive the respective rear ends of said rods; clip means slidably mounted in each end of said handle and including integral pin members adapted to positively locate said handle end with respect to said rod end, to lock said handle to said respective rear ends and to provide an integral hook extending therefrom; a flexible service bag including a substantially rectangular opening having supporting eyelets at the respective front and rear corners thereof, said front eyelets being adapted for connection to the front ends of said rods and said rear eyelets being adapted for connection to said hooks thereby enabling said bag to be freely supported by said rods; a foot stand connected to said plate enabling said cart to be parked in upright position; said cart being collapsible through disengagement of said clip means, removal of said handle and inwardly folding of said rods.

References Cited in the file of this patent

UNITED STATES PATENTS

| 2,482,827 | Black | Sept. 27, 1949 |
| 2,758,847 | Shone | Aug. 14, 1956 |
| 2,789,829 | Parker | Apr. 23, 1957 |

FOREIGN PATENTS

| 815,150 | Germany | Sept. 27, 1951 |